Figure 1:
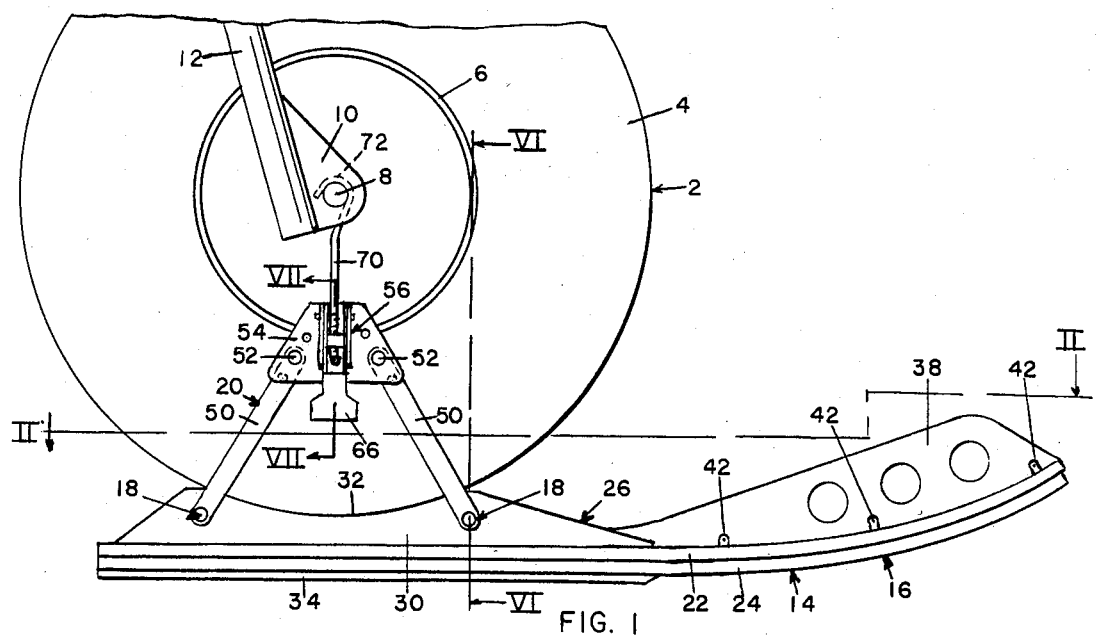

United States Patent [19]  
Harris

[11] Patent Number: 4,577,876  
[45] Date of Patent: Mar. 25, 1986

[54] SKI ATTACHMENT FOR VEHICLE WHEELS

[76] Inventor: Walter L. Harris, 9736 Reeder, Overland Park, Kans. 66214

[21] Appl. No.: 701,919

[22] Filed: Feb. 14, 1985

[51] Int. Cl.[4] ............................................. B62B 19/02
[52] U.S. Cl. ...................................... 280/13; 280/7.12
[58] Field of Search ............... 244/101, 108; 280/7.12, 280/8–11, 12 R, 12 K, 12 L, 13–15, 22, 28, 610

[56] References Cited

U.S. PATENT DOCUMENTS

| | | | |
|---|---|---|---|
| 773,959 | 11/1904 | Meissner | 280/7.12 |
| 1,146,504 | 7/1915 | Knapp | 280/13 |
| 2,352,966 | 7/1944 | Morando | 280/8 |
| 3,774,926 | 11/1973 | Chase | 280/13 |
| 4,094,528 | 6/1978 | Cluzel | 280/610 |
| 4,466,627 | 8/1984 | Gottlieb | 280/22 |

FOREIGN PATENT DOCUMENTS 30376 3/1917 Norway ................................. 280/13

Primary Examiner—David M. Mitchell  
Assistant Examiner—Eric D. Culbreth  
Attorney, Agent, or Firm—John A. Hamilton

[57] ABSTRACT

A ski attachment for a free-turning vehicle wheel consisting of one or more skis, rigidly joined if more than one, adapted to be placed beneath the wheel in line therewith, a cradle carried on the top of the ski, to the rear of center thereof, and configurated to receive and support the lower portion of the tire of the wheel, and tension devices for drawing the cradle into indenting relation to the tire. The tension devices may consist of connectors joining the cradle to the wheel axle at each side of the wheel, or of steel straps surrounding tire peripherally and joined at their ends to the cradle. A special ski bottom configuration assists in preventing lateral slipping or skidding in turns.

5 Claims, 11 Drawing Figures

SKI ATTACHMENT FOR VEHICLE WHEELS

This invention relates to new and useful improvements in snow gear for various types of vehicles, specifically ski attachments for the wheels for permitting them to function efficiently on snow surfaces. Such attachments are most commonly used on recreational vehicles of the motorcycle type, even though they may have two, three or even four wheels, and vehicles intended for off-road use. Specifically, the attachment contemplated by the present invention is adapted for use on non-driven, usually free-turning wheels of such vehicles, not their powered driving wheels, which utilize other types of ski attachments not here involved. In motorcycle-type vehicles, the non-powered, free-turning wheel is usually the front steerable wheel, and the present attachment will be described in connection with such a wheel, although it will be understood that its use is not limited to this particular application.

Particular problems encountered with ski attachments of this general type include the difficulty of securing them to the usually soft, low-pressure tires with which the vehicle is nearly always fitted, with sufficient firmness and rigidity to insure that they will always maintain the proper attitude relative to the wheel. This is of course necessary to the proper steering and tracking of the vehicle. The solution of this problem is one of the objects of the present invention. This object is accomplished by providing a cradle member affixed to the top of the ski member, this cradle member being contoured to engage the curved periphery of the tire, but presenting surfaces of only very limited area in actual contact with the tire, and tension means operable to draw said cradle member into indenting relation with the tire surface. In one embodiment of the invention, said tension means takes the form of flexible links joining the cradle member to the wheel axle through a manually operable toggle link, and in another embodiment it takes the form of a flexible steel belt fastened to the cradle member and encircling the periphery of the tire, the belt being divided and having its ends connected by a manually operable toggle link.

Another commonly encountered problem is that of preventing the point of the ski from nosing downwardly and becoming buried, particularly in soft snow. The wheel itself is usually free-turning, and if the ski point catches in the snow, the wheel turns to bury the ski point. The present structure solves this problem by centering the vehicle weight supported by the ski well to the rear of the center of the normal load-supporting length of the ski. This tends strongly to maintain the point of the ski up, taking advantage of the free-turning of the wheel for this purpose.

Still another commonly encountered problem is that of maintaining only a ski area dictated by the snow condition in actual contact with the snow, in order to provide the best vehicle speed, while at the same time preventing side slipping or skidding when negotiating a turn. In soft snow, maximum ski area is required for good vehicle support, and there is very little danger of skidding. Where the snow is firmly packed less ski area is required for support, but the danger of skidding is increased. Where the snow is packed hard, or even constitutes solid ice, very little ski area is required for support, but the danger of skidding in turns is extreme. In the present structure, this problem is solved by the provision of a ski having a broad upper layer providing maximum support in soft snow, a narrower lower layer providing adequate support in firmly packed snow when the upper layer is lifted out of contact with the snow, and a pair of sharp-edged, longitudinally extending guide blades affixed to the lower surface of the narrower layer and providing the sole support on hard-packed snow or ice surfaces when both of the other layers are lifted out of contact with the snow. In each of these conditions, the added concentration of vehicle weight on the then effective ski elements provides that they will "bite" into the snow surface to prevent lateral sliding, slipping or skidding.

Other objects are simplicity and economy of construction, and efficiency and dependability of operation.

Figure 2:
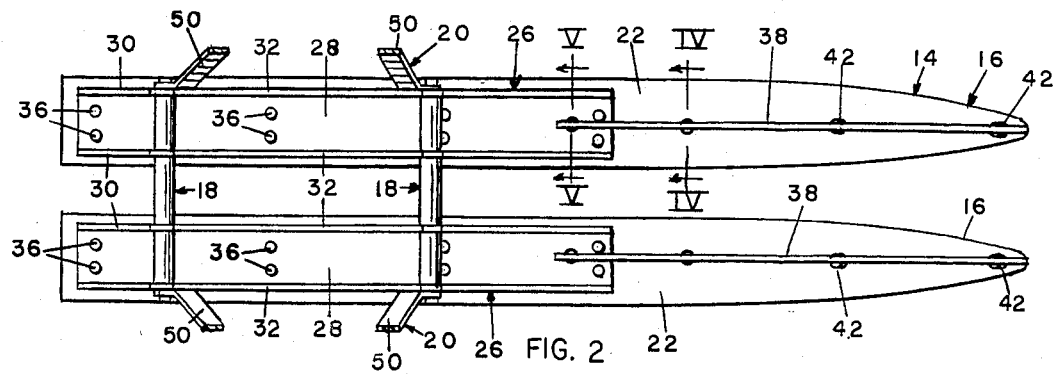
Figure 3:
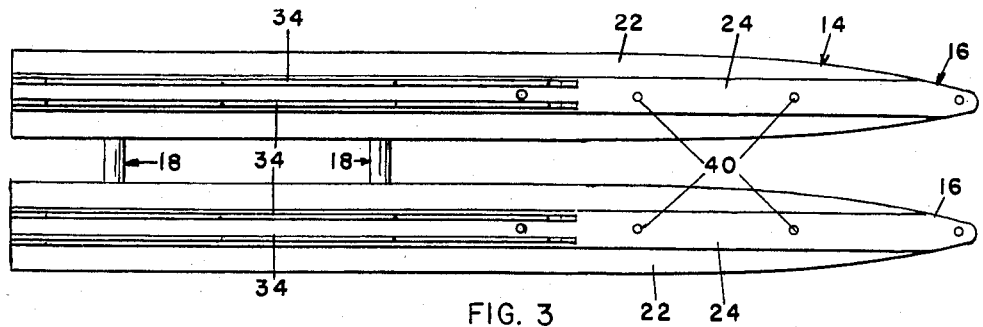
Figure 4:
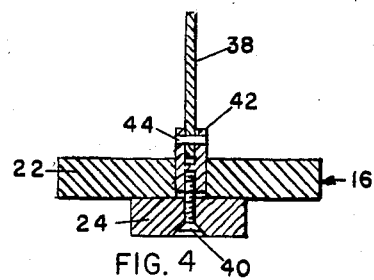
Figure 5:
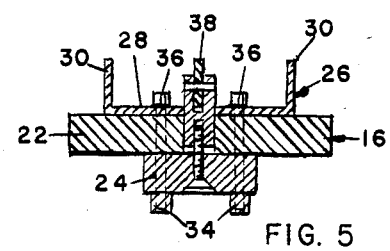
Figure 6:
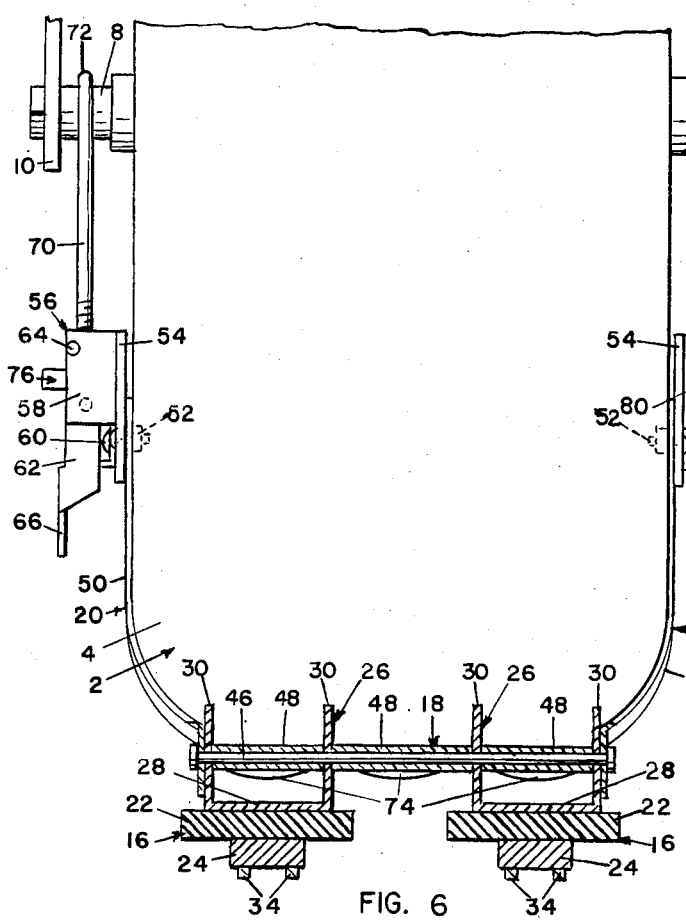
Figure 7:
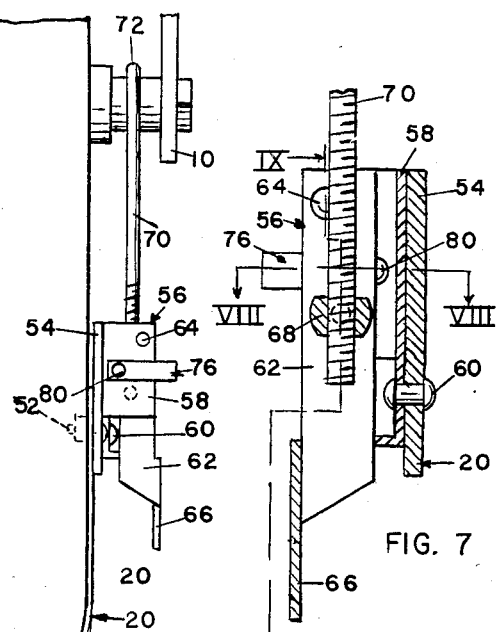
Figure 8:
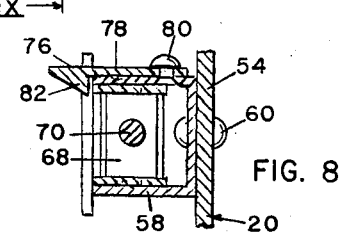
Figure 9:
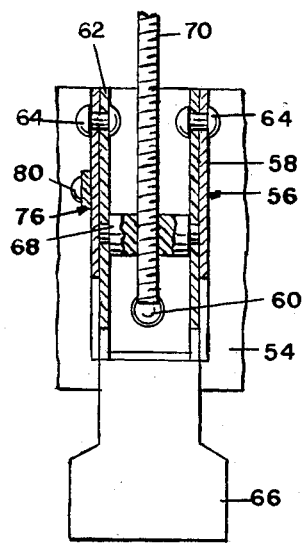
Figure 10:
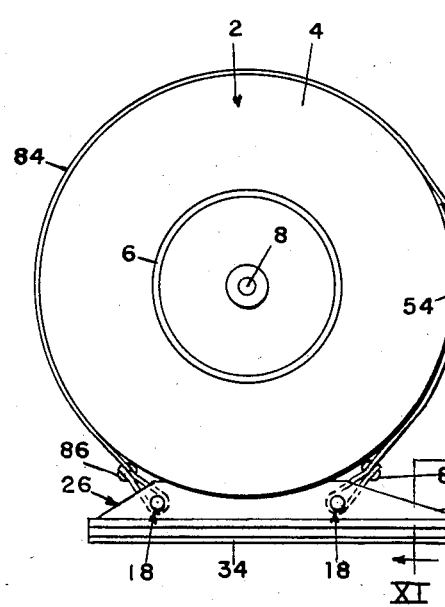
Figure 11:
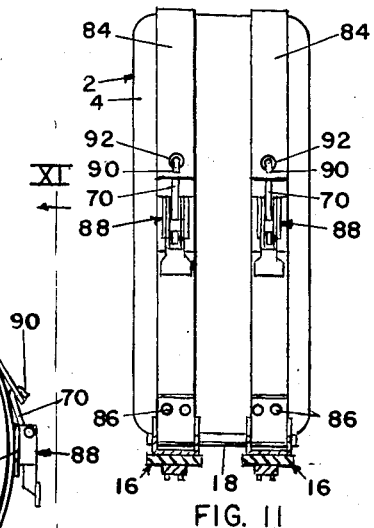

With these objects in view, as well as others which will appear in the course of the specification, reference will be had to the accompanying drawing, wherein:

FIG. 1 is a fragmentary side elevational view of the front wheel of a motorcycle wheel and related parts, having a ski attachment embodying the present invention operatively applied thereto, FIG. 2 is a sectional view taken on line II—II of FIG. 1, with the tire of the wheel omitted, FIG. 3 is an inverted plan view of the ski members, FIG. 4 is an enlarged sectional view taken on line IV—IV of FIG. 2, FIG. 5 is an enlarged sectional view taken on line V—V of FIG. 2, FIG. 6 is an enlarged fragmentary sectional view taken on line VI—VI of FIG. 1, with the tire left in elevation, FIG. 7 is an enlarged fragmentary sectional view taken on line VII—VII of FIG. 1, FIG. 8 is a fragmentary sectional view taken on line VIII—VIII of FIG. 7, FIG. 9 is a fragmentary sectional view taken on line IX—IX of FIG. 7, FIG. 10 is a view generally similar to FIG. 1, but showing a modification of structure, and FIG. 11 is a sectional view taken on line XI—XI of FIG. 10.

Like reference numerals apply to similar parts throughout the several views, and in FIG. 1 the numeral 2 applies generally to the front wheel of a motorcycle or other vehicle, said wheel consisting of a tire 4 mounted on a rim 6 carried rotatably by an axle 8. Each end of the axle is mounted in a flange 10 of one of the arms 12 of the front fork of the cycle frame, in a manner well known in the art.

The ski attachment forming the subject matter of the present invention is indicated generally by the numeral 14, and as shown consists of a pair of identical skis each indicated generally by the numeral 16, connectors 18 rigidly joining the two skis 16 together in parallel, spaced apart relation, and, as shown in FIGS. 1-9, a connector indicated generally by the numeral 20 providing a tensile connection between skis 16 and wheel axle 8.

Each ski 16 includes an upper, relatively broad slat 22 and a relatively narrow lower slat 24 centered on the lower surface of the upper slat. These slats engage the snow. They may be formed of any suitable material, a high density polymer having been found especially desirable in that it is extremely tough and durable, is completely impervious to moisture and cold, and is highly resistant to roughening by wear, in that it simply becomes smoother and slicker in use. This material, however, is very stiffly pliable rather than resilient, particularly in longer lengths as in skis, and therefore requires reinforcement. The skis are taperingly narrowed toward their forward ends, and curved upwardly, all as well known in the art. The rearward straight portion of each ski is reinforced by an upwardly opening metal channel 26 extending substantially the full length thereof, having its web 28 lying flat against the top surface of slat 22, and its flanges 30 projecting upwardly therefrom. The upper edges 32 of all of flanges 30 are concavely curved to the peripheral curvature of the vehicle tire 4, thereby constituting channels 26 as a cradle for receiving said tire to rest therein. The centers of curvature of flange edges 32 are disposed well to the rear of center of the rearward straight portions of the skis. A pair of narrow steel guide blades 34 extend along the lower surface of lower slat 24, extending to the forward end of the straight ski portion, and disposed respectively adjacent the opposite lateral edges of slat 24. Preferably, these blades are of square, sharp-edged cross-sectional contour. Slats 22 and 24, channel 26 and blades 34 are assembled rigidly together by screws 36, distributed along the length of channel 26, extending through both slats and rigidly joining the web 28 of the channel to both of blades 34.

The forward curved and tapered portion of each ski is reinforced by a decoratively configurated metal plate 38, disposed in a vertical plane at the transverse midline of the ski. It extends the full length of the curved ski portion and overlaps the forward portion of channel 26 to combat any tendency of slats 22 and 24 to "fold" at the juncture of the channel and plate 38. The plate is secured to slats 22 and 24 by a series of screws 40, distributed along the length thereof (see FIG. 4). Each screw is countersunk into slat 24, extends through both of the slats, and is threaded at its upper end into a coupling 42 connected to the lower edge of the plate 38 by a horizontal pivot pin 44.

The two connectors 18 rigidly joining the two skis are disposed respectively adjacent the forward and rearward ends of the cradle curvature 32 of the channel flanges 30, and each consists, as best shown in FIG. 6, of a single bolt 46 extending transversely and horizontally through all four of the flanges, and a spacer tube 48 disposed on the bolt between each successive pair of flanges.

The connector 20 detachably connecting the ski attachment 14 to the vehicle, as shown in FIGS. 1-9, includes a pair of flexible steel straps 50 connected pivotally at their lower ends respectively to the forward and rearward bolts 46 of connectors 18, at each of the sidemost flanges 30 of channels 26, as best shown in FIGS. 1 and 6. At each side of the ski assembly, straps 50 converge upwardly, and each is pivoted at its upper end, as at 52, to a vertical plate 54. The plates 54 are disposed at the opposite lateral sides of tire 4. Plates 54, and straps 50, may be provided with extra holes for receiving pivots 52, which may be bolts, said holes being spaced apart longitudinally of the straps, to permit vertical adjustment of plates 54 to wheels of different diameters, as will appear. The pivotal connections 18 and 52 of each strap provide that it will always be in direct tension regardless of their angularity, and the flexibility of the straps provides that they may be curved outwardly around the sides of a tire 4 which is laterally thicker than the transverse width of the ski assembly, as shown in FIG. 6.

Each plate 54 is detachably connected to wheel axle 8, at the same side of the tire, by a toggle connector indicated generally by the numeral 56. As detailed in FIGS. 6-9, connector 56 includes a vertically disposed channel shaped body member 58 pivoted to plate 54 adjacent its lower end by a rivet 60, a lever 62 pivoted at its upper end in body member 58 by rivets 64 and forming a handle 66 at its lower end, a nut 68 pivoted in said lever below and parallel to the lever pivot, and a generally vertical screw 70 threaded in nut 68, transversely to its pivot, said screw extending upwardly and forming at its upper end a hook 72 adapted to engage over wheel axle 8, as shown in FIGS. 1 and 6. When handle 66 is grasped and moved to the left, as viewed in FIG. 7, the outward and upward pivoting of lever 62 elevates nut 68 and screw 70 to allow hook 72 to be engaged over or disengaged from axle 8, as desired. The pivoting of body 58 on rivet 60 allows the hook to be moved freely either forwardly or rearwardly, as may be necessary to effect engagement or disengagement of the hook conveniently. When the handle is then pivoted downwardly to the position shown in FIG. 7, the resultant shortening of the toggle pulls hook 72 downwardly against axle 8, and pulls arcuately contoured edges 32 of channels 26 upwardly into indenting relation to the tire, as illustrated by the downward bulging of the tire between flanges 30 shown at 74 in FIG. 6. The tires with which motorcycle-type vehicles of the type commonly used for off-road ski use are large and utilize very low air pressure. As shown in FIG. 7, it will be seen that as lever 62 of the toggle approaches its closed position, the axis of screw 70 passes the axis of lever pivot rivets 64, so that the toggle locks. However, to prevent the possible accidental opening of the toggles, as could occur on a bumpy ski trail when a bump might momentarily compress the tire and hence remove tension from the toggle, a safety lock 76 may be provided, as shown in FIGS. 7-9. It comprises, as best shown in FIG. 8, a spring arm 78 affixed at one end to toggle body 58 by a rivet 80 and having at its opposite end a bevelled tooth 82 which engages an edge of lever 62 which must move outwardly to open the toggle. The tooth, due to its bevel, is cammed outwardly to engage the lever automatically when the toggle is closed, but must be manually deflected to permit opening of the toggle.

Operation of the ski attachment as thus far described is believed to be reasonably self-evident from the foregoing description, and it will be seen to possess several advantages. The length adjustments of straps 50 provided by their end fittings permits the attachment to be readily adjusted for use on vehicle wheels of any diameter in use. The very small area of contact between the upper edges of channel flanges 30 and the tire, together with the force pressing these elements together as provided by toggle fasteners 56, provides that said flanges are drawn into deeply indenting relation to the tire. This indentation, together with the arcuate curvature 32 of the flange edges, provides that the skis are held very firmly in proper relation to the tire, eliminating the disconcerting and possibly quite dangerous inaccuracies of steering which could occur if the skis were allows to track in a line different from that of the wheel. Actually, the curvature of the "cradle" edges need not conform accurately to the normal peripheral curvature of the tire, since due to the indentation of the tire as described, one curvature may provide secure attachment to tires of different diameters. The positioning of the wheel substantially to the rear of the midpoints of the rearward straight portions of the skis, which is the normal snow-engaging portion of said skis, concentrates the vehicle weight supported by the wheel at this point, and results in a strong tendency for the ski to ride in a nose-up attitude. This attitude strongly resists any tendency of the points of the skis to dig into and become mired in the snow, particularly when the snow is very soft.

The "stepped" transverse bottom contour of each ski is also very important, as well as the high-density polymer of which slats 22 and 24 thereof are formed. Relative to this bottom contour, it will be apparent that the entire bottom area of the skis will engage in soft snow, thereby providing the maximum support area for the vehicle weight as is required for snow surfaces of this type. On firmly packed snow, only lower slat 24 and blades 34 may engage the snow, while on very hard-packed snow or ice only blades 34 may engage the surface. At each of these successive steps, the only ski area actually engaging the snow or ice surface is that necessary for good vehicle support. This is considered advantageous in permitting easier attainment of higher speeds, as is generally desired. However, it also provides a higher concentration of vehicle weight at the lateral edges of the ski elements then providing the primary vehicle support (i.e. lower slat 24 or blades 34), since those elements must then support the vehicle weight previously carried by higher ski elements (i.e. lower slat 24 or both of slats 22 and 24). This added weight concentration at the lateral edges of the skis is highly effective in preventing lateral slipping or skidding when the wheel is turned to negotiate a curve, in that said concentration causes the edges to bite into the snow surface to resist such lateral skidding more effectively. Still higher weight concentration on one edge of a ski occurs in a turn if the ski tilts laterally in the turn, that being the edge at the inside of the turn. If the ski attachment is applied to a front vehicle wheel carried by steerable front fork arms 12, as in FIG. 1, such tilting occurs automatically to some degree due to the inclination of the fork, even if the vehicle has two laterally spaced rear wheels which resist general tilting of the vehicle in turns. In the case of a two-wheeled vehicle, lateral tilting of both the vehicle and the ski is of course much more pronounced.

FIGS. 10 and 11 show a modification of structure in which the ski assembly 14 is identical in all pertinent respects to that utilized in FIGS. 1-9, but in which the connector members 20 consisting of straps 50 and toggle devices 56 are eliminated, and there is substituted therefor a pair of flexible steel belts 84 adapted to be passed about the periphery of tire 4 in side by side relation, as shown. The opposite ends of each belt are connected respectively to the forward and rearward connectors 18 of the ski assembly, by being looped around said connector and secured to itself by rivets 86. Each belt is also divided intermediate its ends, preferably at a point to be disposed at the front of the tire, in order to provide easy access, and the belt ends at this division are connected by a toggle link 88. This toggle link may be identical with the link 56 used in FIGS. 1-9, except that it has no need of the pivotal mounting provided by rivet 60 used by the latter, and that its screw 70 forms a hook 90 adapted to be engaged in a hole 92 formed in the opposite end of the belt. Here again, the toggle should be so adjusted that when closed, it draws the belts into indenting relationship with the tire. Once thus applied, the function and operation of the modified structure is substantially identical with that shown in FIGS. 1-9. It should be noted that while both species of the attachment I have illustrated utilize the use of two skis 16 joined in side by side parallel relation, the principles involved are equally applicable to attachments having only one ski, where they are to be applied to wheels which are laterally much thinner than shown, for example, in FIG. 6. In FIG. 6, the two sets of straps 50 would be attached respectively to the opposite flanges 30 of the single channel 26, and in FIG. 11, only one belt 84 would be used.

While I have shown and described certain specific embodiments of my invention, it will be readily apparent that many minor changes of structure and operation, including those described above as well as others, could be made without departing from the spirit of the invention.

What I claim as new and desire to protect by Letters Patent is:

1. A ski attachment for a non-driven, free-turning vehicle wheel having a compressible tire, said attachment comprising:
   a. a ski having a substantially straight rear portion and an upwardly curved front portion, and adapted to be positioned beneath said wheel parallel to the line of travel thereof,
   b. a rigid cradle member affixed to the top surface of said straight rear ski portion, the top of said cradle member being configurated to receive and support the lower portion of said tire therein, and
   c. tension means detachably interconnecting said cradle member with an axle of said wheel, and manually operable to draw said cradle member into compressing engagement with said tire, whereby said ski is held in substantially fixed relation to said tire, said tension means comprising:
      (1) a pair of straps secured at their lower ends to said cradle member respectively adjacent the forward and rearward ends of the latter, and converging upwardly in a plane parallel to the plane of the wheel, there being a pair of said straps at each of the respectively opposite sides of the cradle,
      (2) a plate secured to the upper ends of each of said pairs of straps,
      (3) a pair of hooks disposed at the respectively opposite sides of said tire, each detachably engageable at its upper end over the axle of said wheel, and extending downwardly therefrom, and
      (4) a toggle link interconnecting each of said plates to the lower end of the associated hook and manually operable both to extend said hook upwardly when open, and to retract said hook downwardly when closed, and to lock said hook releasably in said retracted position.

2. A ski attachment as recited in claim 1 wherein said toggle link is pivoted to said plate on an axis normal to the plane of said plate, whereby said hook may be moved freely parallel to the wheel plane to effect engagement or disengagement thereof to or from the axle of said wheel.

3. A ski attachment as recited in claim 1 with the addition of an automatically engageable, manually disengageable safety lock for securing said toggle link in its closed position.

4. A ski attachment as recited in claim 1 wherein both ends of said straps are pivotally secured respectively to said cradle member and to said plate, and with the addition of means operable to adjust variably the effective lengths of said straps.

5. A ski attachment as recited in claim 1 wherein said straps are transversely flexible, whereby to be capable of curving outwardly around the side of the tire if said tire is transversely thicker than the lateral spacing between the straps at opposite sides of the tire at the lower end connections of said straps.

* * * * *